though the telescope as usual. It will thus be seen that the rotary adjustment of the telescope in the supporting assembly 17, as above described, provides convenient access to the finder tube 12 and the eye piece without disturbing the orientation of the telescope axis or without losing the object being tracked in the telescope.

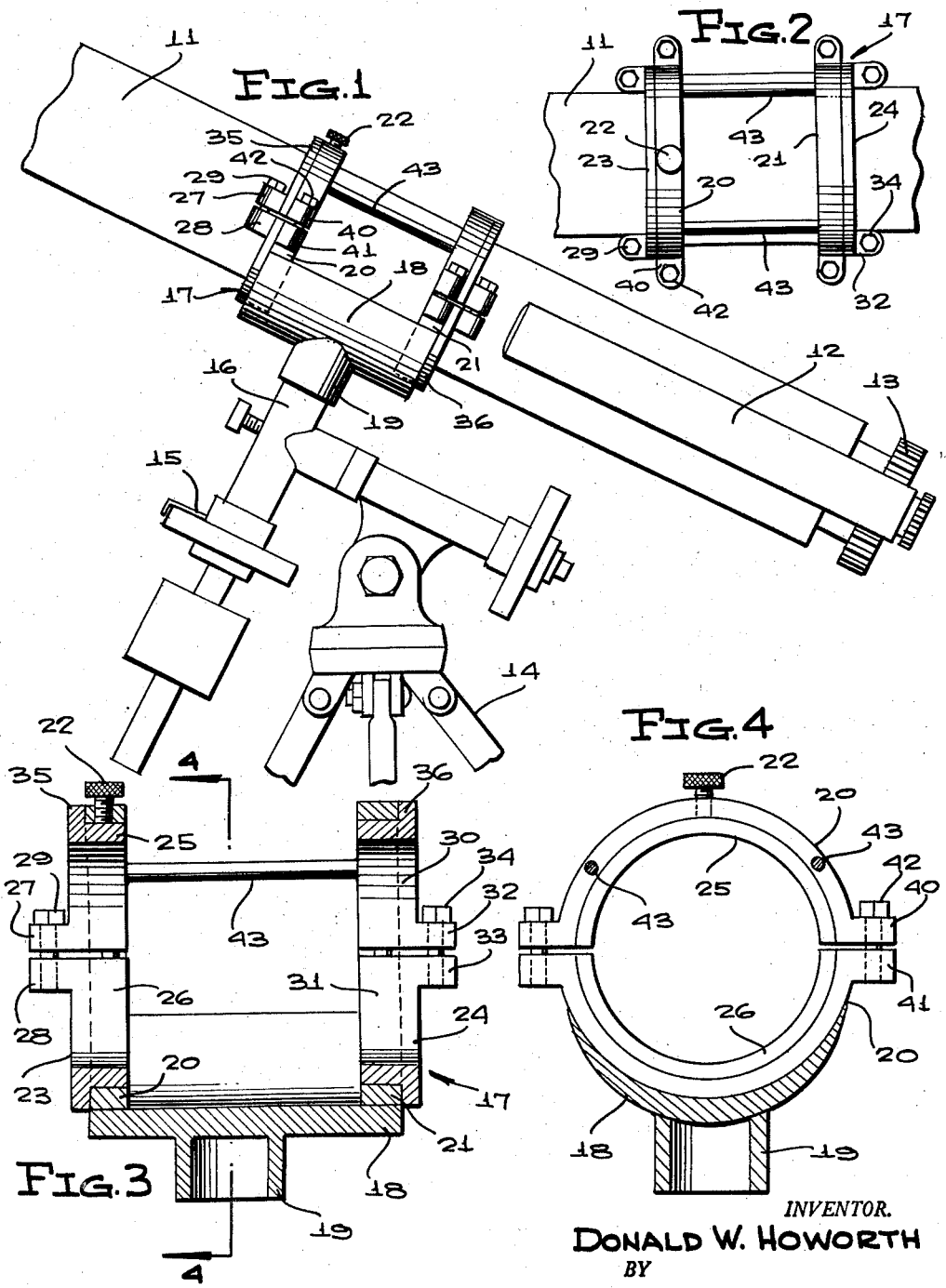

2,908,459

SLIP RING MOUNT FOR TELESCOPES

Donald W. Howorth, South San Gabriel, Calif.

Application April 4, 1958, Serial No. 726,391

3 Claims. (Cl. 248—38)

This invention relates to telescope supports, and more particularly to a supporting assembly for adjustably supporting a telescope on an equatorial mount or in any other conventional telescope orienting assembly in a manner allowing the telescope to be rotated so that the eye piece and the finder thereof will be conveniently positioned for use by an observer.

A main object of the invention is to provide a novel and improved supporting assembly for a telescope, particularly for a telescope of the reflector type wherein the eye piece is mounted on one side of the telescope tube, the supporting assembly being arranged so that the telescope may be rotated to provide access to the eye piece without disturbing the orientation of the telescope, the assembly being simple in construction, being easy to install, and involving only a few parts.

A further object of the invention is to provide an improved supporting assembly for a telescope of the Newtonian or reflector type wherein the eye piece is mounted on one side of the telescope tube and wherein a finder telescope may be mounted on the main telescope tube, the supporting assembly being arranged to support the telescope on a conventional mounting, such as an equatorial mounting and being provided with means for rotary adjustment of the telescope around its axis to provide convenient access to the eye piece and finder tube without disturbing the orientation of the telescope and without losing the object being viewed therein.

Further objects and advantages of the invention will become apparent from the following description and claims, and from the accompanying drawings, wherein:

Figure 1 is a fragmentary side elevational view of a telescope provided with an improved supporting assembly according to the present invention, shown installed on a conventional equatorial mount.

Figure 2 is a top view of the supporting assembly and the portion of the telescope adjacent thereto, as shown in Figure 1.

Figure 3 is an enlarged longitudinal vertical cross sectional view taken through the telescope supporting assembly employed in Figures 1 and 2.

Figure 4 is a transverse vertical cross sectional view taken on the line 4—4 of Figure 3.

Referring to the drawings, 11 designates a conventional telescope which may be provided, for example, with an auxiliary finder telescope 12 mounted on one side thereof. The telescope 11 may also be provided with a suitable eye piece, which in the case of the illustrated telescope is designated at 13 and which is located at an end of the telescope. However, within the spirit of the present invention, the eye piece may be mounted on one side of the telescope in a manner similar to that in which the finder tube 12 is mounted.

Designated at 14 is a conventional tripod provided with an equatorial mount, shown generally at 15, the mount including the main stem portion 16. The telescope 11 is supported on the top end of the main stem portion 16 by an assembly 17 constructed in accordance with the present invention.

The assembly 17 comprises a main cradle element 18 which is arcuate in transverse cross section and which has rigidly secured to its intermediate portion a collar member 19 extending perpendicular to the axis of the cradle member 18. The collar member 19 snugly receives the top end of the main stem 16 of the equatorial mount 15.

Rigidly secured to the respective end portions of the cradle member 18 are the respective ring members 20 and 21 which are arranged in parallel coaxial relationship and which are of the same diameter. The ring member 20 is provided with a clamping screw 22 threadedly engaged through its top portion.

As shown, the ring members 20 and 21 may be of the split type, namely, may comprise opposing mating semi-circular segments which are provided at their ends with clamping lugs 40, 41 and which are fastened together by suitable bolts 42 engaged through the lugs 40 and threadedly engaged in the lugs 41. The upper ring segments are preferably rigidly connected by longitudinal rod elements 43 so that said upper ring segments define a unitary assembly corresponding to and mating with the unitary assembly defined by the cradle member 18 and the lower semi-circular ring segments.

Respective flanged split collar assemblies 23 and 24 are rotatably engaged in the ring members 20 and 21, the split collar assembly 23 comprising an upper segment 25 and a mating lower segment 26.

The opposing semi-circular segments 25 and 26 are formed at their ends with the opposing pairs of apertured lugs 27, 28, and clamping bolts 29 are engaged through the respective lugs 27 and are threadedly engaged in the lugs 28 so that clamping pressure may be exerted between the segments by tightening the bolts 29. Similarly, the split collar assembly 24 comprises a semi-circular top segment 30 and an opposing semi-circular bottom segment 31, the segments being formed at their ends with the respective opposing pairs of apertured lugs 32, 33. Clamping bolts 34 extend through the lugs 32 and are threadedly engaged in the lugs 33, whereby clamping pressure may be exerted between the split collar segments 30 and 31 by tightening the bolts 34.

The respective split collar assemblies 23 and 24 are provided with the outwardly extending flanged elements 35, 36 which are engageable with the rings 20 and 21 to limit endwise movement of the collar segments after the segments have been clamped to a telescope 11.

As shown, the telescope 11 is received in the split collar assemblies 23 and 24 and is clamped thereto by tightening the bolts 29, 34. The telescope is thus rotatably supported in the rings 20 and 21 on the split collar assemblies 23 and 24 and may be locked in a desired position by tightening the clamping screw 22.

Thus, when the telescope has been oriented so that it is aligned with a particular object under observation, the telescope may be rotated to bring its finder tube 12 or its eye piece into a desired position convenient for use by the observer. This is done by first loosening the clamping screw 22, allowing the telescope to be rotated on its axis. After the telescope has been rotated to the desired position thereof, it may be locked in said position by tightening the set screw 22. As is readily apparent, this adjustment does not disturb the orientation of the telescope but allows the finder tube 12, or the eye piece, in the case of a side-mounted eye piece, to be rotated to a position most convenient for use by the observer.

As is well understood by those skilled in the art, in setting up the telescope, the telescope is centered on an object to be viewed, after which the declination axis of the equatorial mount is locked and the object is tracked or followed by the use of the hour axis only, namely, the axis which swings in an arc corresponding to the motion of the earth in reference to the object. However, with ordinary telescope supporting means, it is usually found that the eye piece and the telescope finder are placed in a most inconvenient position for viewing the object. By using the supporting assembly of the present invention, the telescope may be rotated around its own axis, as required, to bring the finder tube or eye piece into a convenient position for use by the observer, without disturbing the other settings of the telescope or losing the objects under observation.

The supporting assembly above described is usable not only with an equatorial mount, but with other well known telescope supporting and orienting assemblies. Furthermore, the present invention is not limited to use with a reflector or Newtonian type of telescope, but may be employed with other types of telescopes such as a refractor telescope and a Cassagrain type.

While a specific embodiment of an improved supporting assembly for a telescope has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A supporting assembly for a telescope comprising a cradle member adapted to be secured on an adjustable telescope mount, respective ring members rigidly secured at their lower portions in spaced parallel, coaxial relation to opposite end portions of said cradle member, respective clamping collar assemblies rotatably received in said ring members and adapted to clampingly engage a telescope received therethrough, rod means extending parallel to said cradle member and rigidly connecting the upper portions of said ring members, and a clamping screw on at least one of said ring members and being clampingly engageable with the associated collar assembly, the upper portions of the ring members being detachably secured to the lower portions thereof, whereby the upper portions of the ring members and said rod means define a first unitary assembly and the lower portions of the ring members and the cradle member define a second unitary assembly.

2. A supporting assembly for a telescope comprising an elongated upwardly concave cradle member of arcuate transverse cross section, means to secure said cradle member on an equatorial mount, respective ring members rigidly secured at their lower portions in spaced parallel, coaxial relation to opposite end portions of said cradle member, respective flanged, split clamping collar assemblies rotatably received in said ring members and adapted to clampingly engage a telescope received therethrough, a plurality of spaced rod members extending parallel to said cradle member and rigidly connecting the upper portions of said ring members, and a clamping screw on at least one of said ring members and being clampingly engageable with the associated collar assembly, the upper portions of the ring members being detachably secured to the lower portions thereof, whereby the upper portions of the ring members and said rod members define a first unitary assembly and the lower portions of the ring members and the cradle member define a second unitary assembly.

3. A supporting assembly for a telescope comprising an elongated upwardly concave cradle member of arcuate transverse cross section, means to secure said cradle member on the top end of an equatorial mount perpendicular to the declination axis thereof, respective ring members rigidly secured at their lower portions in spaced parallel, coaxial relation to opposite end portions of said cradle member, respective opposing semi-circular flanged collar segments rotatably received in said ring members, means clampingly connecting the ends of the opposed collar segments, whereby said opposed segments may clampingly engage a telescope received therethrough, rod members overlying opposite side margins of said cradle member and extending parallel to said cradle member, said rod members being rigidly connected at their ends to the upper portions of the ring members, and a clamping screw on the top portion of at least one of said ring members and being clampingly engageable with one of the collar segments received therein the upper portions of the ring members being detachably secured to the lower portions thereof, whereby the upper portions of the ring members and said rod members define a first unitary assembly and the lower portions of the ring members and the cradle member define a second unitary assembly.

References Cited in the file of this patent

UNITED STATES PATENTS

| | | |
|---|---|---|
| 726,015 | Becroft | Apr. 21, 1903 |
| 773,813 | Saegmuller | Nov. 1, 1904 |
| 1,126,321 | Walther | Jan. 26, 1915 |
| 1,378,319 | Brooks | May 17, 1921 |
| 2,128,409 | Hager | Aug. 30, 1938 |
| 2,601,613 | Jahncke | June 24, 1952 |